(12) United States Patent
Kunnari et al.

(10) Patent No.: US 10,865,280 B2
(45) Date of Patent: Dec. 15, 2020

(54) METHOD OF PRODUCING FILMS FROM HIGH CONSISTENCY ENZYME FIBRILLATED NANOCELLULOSE

(71) Applicant: Teknologian tutkimuskeskus VTT Oy, Espoo (FI)

(72) Inventors: Vesa Kunnari, Espoo (FI); Jaakko Pere, Espoo (FI); Jaakko Hiltunen, Espoo (FI); Katariina Kemppainen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 16/066,687

(22) PCT Filed: Dec. 30, 2016

(86) PCT No.: PCT/FI2016/050940
§ 371 (c)(1),
(2) Date: Jun. 28, 2018

(87) PCT Pub. No.: WO2017/115020
PCT Pub. Date: Jul. 6, 2017

(65) Prior Publication Data
US 2019/0002658 A1 Jan. 3, 2019

(30) Foreign Application Priority Data
Dec. 31, 2015 (FI) ...................... 20156042

(51) Int. Cl.
| | | |
|---|---|---|
| *C08J 5/18* | (2006.01) | |
| *C08L 1/02* | (2006.01) | |
| *D21H 11/18* | (2006.01) | |
| *D21C 5/00* | (2006.01) | |
| *D21H 11/20* | (2006.01) | |
| *D21H 17/31* | (2006.01) | |
| *D21H 17/26* | (2006.01) | |
| *D21H 17/36* | (2006.01) | |

(52) U.S. Cl.
CPC .............. *C08J 5/18* (2013.01); *C08L 1/02* (2013.01); *D21C 5/005* (2013.01); *D21H 11/18* (2013.01); *D21H 11/20* (2013.01); *D21H 17/26* (2013.01); *D21H 17/31* (2013.01); *D21H 17/36* (2013.01); *C08J 2301/02* (2013.01); *C08L 2203/16* (2013.01)

(58) Field of Classification Search
CPC ......... C08J 5/18; C08J 2301/02; D21H 17/36; D21H 17/26; D21H 17/31; D21H 11/20; D21H 11/18; D21C 5/005; C08L 1/02; C08L 2203/16
See application file for complete search history.

(56) References Cited

U.S. PATENT DOCUMENTS

| | | | | |
|---|---|---|---|---|
| 2,308,161 A | * | 1/1943 | Eckstein | ................... B29D 7/00 34/454 |
| 6,152,345 A | * | 11/2000 | Griffin | .................... B65H 20/06 226/172 |
| 10,000,614 B2 | * | 6/2018 | Tammelin | ............ C09D 101/02 |
| 2002/0102369 A1 | * | 8/2002 | Shimizu | ................ C08F 251/02 428/1.33 |
| 2005/0271834 A1 | * | 12/2005 | Michihata | ................... C08J 5/18 428/1.31 |
| 2012/0119169 A1 | * | 5/2012 | Kaneko | ....................... C08J 5/18 252/585 |
| 2012/0291974 A1 | * | 11/2012 | Kajanto | .................... D21F 2/00 162/202 |
| 2013/0280545 A1 | * | 10/2013 | Husband | ................ D21H 19/34 428/464 |
| 2014/0234640 A1 | * | 8/2014 | Kohno | .................... B29C 41/24 428/452 |
| 2014/0255688 A1 | * | 9/2014 | Salminen | ................... C08J 5/18 428/339 |
| 2015/0315747 A1 | * | 11/2015 | Heiskanen | ............. D21G 11/18 162/181.2 |
| 2016/0024718 A1 | * | 1/2016 | Lee | ........................ D21C 9/007 162/9 |
| 2017/0067207 A1 | * | 3/2017 | Malkki | .................... A61L 15/28 |
| 2018/0245289 A1 | * | 8/2018 | Heiskanen | ............. D21H 21/16 |
| 2019/0300677 A1 | * | 10/2019 | Malmborg | ............. D21H 21/14 |

FOREIGN PATENT DOCUMENTS

| | | |
|---|---|---|
| JP | 2008209595 A | 9/2008 |
| JP | 2011158746 A | 8/2011 |
| JP | 2013043963 A | 3/2013 |
| JP | 2014084431 A | 5/2014 |
| WO | WO2011004300 A1 | 1/2011 |
| WO | WO2011056130 A1 | 5/2011 |

(Continued)

OTHER PUBLICATIONS

Zhu et al: Integrated production of nano-fibrillated cellulose and vellulosic biofuel by enzymatic fibrillation of wood fibers. Green Chemistr,y vol. 13, No. 5, 2011, pp. 1339-1344.

Chinga-Carrasco et al: Computer-assisted quantification of the multi-scale structure of films made of nanofibrillated cellulose. J Nanopart Res Springer , Jul. 23, 2009, No. 12, pp. 841-851.

Ummartyotin et al: Development of transparent bacterial cellulose nanocomposite film as substrate for flexible organic light emitting diode (OLED) display. Industrial Crops and Products. vol. 35, 2012, pp. 92-97.

* cited by examiner

Primary Examiner — Jeffrey M Wollschlager
(74) Attorney, Agent, or Firm — Laine IP Oy

(57) ABSTRACT

According to an example aspect of the present invention, there is provided a method of producing films from nanocellulose based raw materials having high consistency and thereby providing low energy consuming and feasible manufacturing process of CNF films and film materials.

12 Claims, 1 Drawing Sheet

(56) References Cited

FOREIGN PATENT DOCUMENTS

Figure 1:
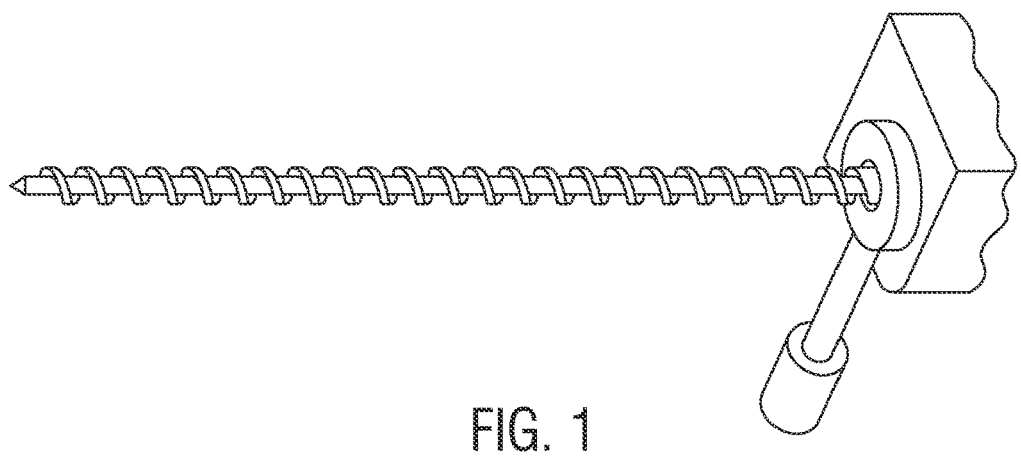

| | | |
|---|---|---|
| WO | WO2013060934 A2 | 5/2013 |
| WO | WO2015092146 A1 | 6/2015 |
| WO | WO2015150620 A1 | 10/2015 |
| WO | WO2016072230 A | 5/2016 |

METHOD OF PRODUCING FILMS FROM HIGH CONSISTENCY ENZYME FIBRILLATED NANOCELLULOSE

FIELD

The present invention relates to a method for producing films from enzyme fibrillated nanocellulose raw material in an energy efficient manner, and to film materials and films prepared accordingly.

BACKGROUND

Typically, standalone nanocellulose films are manufactured from approximately 2% consistency CNF suspension by solvent casting methods, followed by evaporation of excess water or solvent alike. The casting is currently done on plastic based substrates. Such manufactured CNF film has very high tensile strength but low toughness, which is vital feature considering further processing steps and end uses. Films are also thin, which limits their use as standalone structures.

In the prior art number of publications can be found relating to cellulose fibrillation methods, wherein cellulose fibers are treated with enzymes and/or mechanically. For example WO 2011/004300 describes treating cellulosic fibers of kraft pulp to produce microfibrillated cellulose or nanocellulose, which method comprises mechanically pre-treating fibers or kraft pulp by shredding or refining, and treating fibers with enzymes such as cellulases.

Zhu et al. (2011) describes an integrated production of nano-fibrillated cellulose and cellulosic biofuel by enzymatic fractionation of wood fibers, wherein cellulase enzymes were used to fractionate cellulose from a bleached kraft *eucalyptus* pulp. Also films made from nano-fibrillated cellulose were found to be optically transparent and mechanically strong and stiff.

However, the prior art does not describe a method for producing films from high consistency nanocellulose raw material.

Thus, there is need for novel processes, which consume less energy and produce tough and thick films from nanocellulose to replace current materials on the market.

SUMMARY OF THE INVENTION

The invention is defined by the features of the independent claims. Some specific embodiments are defined in the dependent claims.

According to a first aspect of the present invention, there is provided a method for producing films from enzyme fibrillated nanocellulose raw material having high consistency.

According to a second aspect of the present invention, there is provided a translucent film material having good mechanical and flame retardant properties.

These and other aspects, together with the advantages thereof over known solutions are achieved by the present invention, as hereinafter described and claimed.

The method according to an embodiment of the present invention is mainly characterized by what is stated in the characterizing part of claim 1.

The film material according to an embodiment of the present invention is mainly characterized by what is stated in claim 8.

Considerable advantages are obtained by means of the invention. It is provided herein novel films, which are for example thicker compared to traditional CNF films. Production process of films is simpler and less energy consuming compared to traditional methods, because the raw material comprise less water to evaporate, whereby less unit operations is required in the process. For the same reasons, off-site production is feasible due to lower transportation costs.

Next, the present technology will be described more closely with reference to certain embodiments.

EMBODIMENTS

The present technology describes a novel method of producing films from high consistency enzyme fibrillated nanocellulose.

Figure 2:
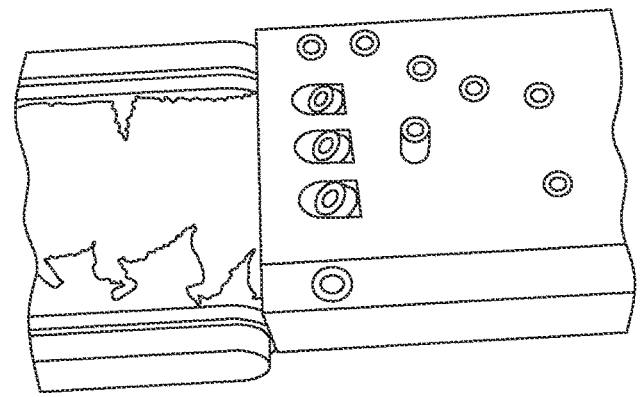
Figure 3:
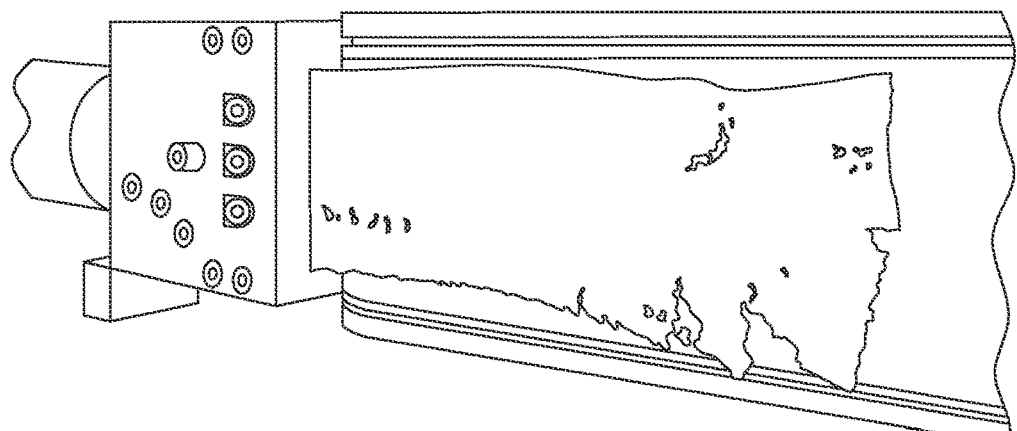

FIG. 1 is an image of the extruder shaft.
FIG. 2 is an image of the reference film upon extrusion.
FIG. 3 is an image of the TEMPO-CNF reinforced film upon extrusion.

According to a preferred embodiment of the present invention, the method for producing a film from enzyme fibrillated nanocellulose raw material comprises following unit operations:

mixing the raw material with additives and forming a fibre web,
laying the fibre web onto a metal substrate,
drying the fibre web on the metal substrate and forming a film material,
delaminating the film material from the metal substrate,
rewinding the film material onto a roll,
calandering the film material from the roll and forming a film having desired thickness.

According to further embodiment of the present invention, the method is characterized in that the film is produced from enzyme fibrillated nanocellulose raw material slurry having a consistency of between 15% and 40%, more preferably between 20% and 30%.

Such method with high consistency nanocellulose raw material enables simpler production process of films, which method consumes less energy compared to traditional methods, because the raw material comprise less water to evaporate, whereby also less unit operations is required in the process. For the same reasons, off-site production is feasible due to lower transportation costs.

Suitable process for manufacturing the nanocellulose raw material is described for example in the patent application WO 2015/092146.

According to an embodiment of the present invention, the film thickness is adjusted to a level between 20 μm and 500 μm, more preferably between 20 μm and 200 μm.

According to a further embodiment of the present invention, the laying of the fibre web onto a metal substrate is carried out by extrusion, which also allows directing the fibres into a desired direction by for example choosing an appropriate nozzle. It is notable that extrusion is not possible for the conventional CNF suspensions having low consistency, such as 2%. Film material adhering onto a metallic support while drying prevents shrinkage of the film. Metallic supports are also preferred because they are typically long-lasting, heat-durable and easy to wash, and also enable a continuous production. Delamination of the film material from the metallic support is carried out for at least essentially dry film.

According to an embodiment of the present invention, the drying takes below 10 hours, depending on the solids consistency of the raw material. For example consistency of 20 to 30% requires only 4 to 5 hours drying time. In comparison to consistency of 2%, which requires 24 hours drying time, the present method provides essentially faster drying step, which accordingly also consumes far less energy than the traditional method using low solids consistency. This, among others, enables a continuous production process, which is a further embodiment of the invention.

According to an embodiment of the invention, high consistency fibrillated cellulose is mixed with additives, which are preferably synthetic or bio-based polymers, to give the film more tolerance for handle ability and toughness by binding the formed film structure. However, additives are not necessarily bound into the film structure. Additives that increase the viscosity and work as plasticizers are thus preferred. Suitable, but not limited to, bio-based additives are for example glycerol, carboxymethylated cellulose (CMC), carrageenan, polyvinyl alcohol (PVA) and TEMPO-oxidized cellulose nanofibrils (TCNF), which may be used for example in amounts such as 1 to 30% from the total weight of the CNF suspension.

A translucent film material comprising nanocellulose fibrils in a dow-like form and having a thickness between 20 μm and 500 μm belongs also to the scope of the present invention. The film material is also characterized by having low surface roughness, such as down to 100 nm.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in areas relating to packaging, transport, electronics, energy storage and construction industry. Films provided herein may for example be used as a part of electronic packaging, as a diagnostic platform, in membrane applications, for biodegradable plastics and for food packaging applications.

EXAMPLES

Example 1. Preparation of Film by Casting

Using bleached softwood pulp as the raw material fibrillated cellulose was prepared enzymatically at a consistency of 25% as described in the patent application WO 2015/092146. After fibrillation enzyme activity was inhibited by increasing temperature up to 90° C. for 20 min. Thereafter the material was filtered and washed thoroughly with deionised water. After washing the consistency of fibrillated cellulose was typically 20-24%.

Casting process requires lower viscosity than typically experienced with fibrillated cellulose after washing stage at 20-24% solids. The material is therefore diluted using water to approximately 12-17% consistency depending on fibrillation stage treatment time. The material is then disintegrated carefully using high shear mixing to unsure even and smooth fibre suspension prior to casting. An additive may be added among fibre suspension to assist finished film handling and treatment in following process steps. Additive is not required for film formation. The film can be casted on a moving support, dried on the support and de-laminated after drying from to support to produce a standalone structure.

Example 2. Preparation of Fibrillated Cellulose Suitable for Extrusion

Using bleached softwood pulp as the raw material fibrillated cellulose was prepared enzymatically at a consistency of 25% as described in the patent application WO 2015/092146. After fibrillation enzyme activity was inhibited by increasing temperature up to 90° C. for 20 min. Thereafter the material was filtered and washed thoroughly with deionised water. After washing the consistency of fibrillated cellulose was typically 20-24%. In order to have fibrillated cellulose material suitable for extrusion in film form different bio-based additives were tested. These included:

Carboxymethylated cellulose (CMC)

Carrageenan

Polyvinyl alcohol (PVA)

TEMPO-oxidized cellulose nanofibrils (TCNF)

The additives were mixed to the high consistency fibrillated cellulose at a final concentration of 1%, 2% or 4% (calculated as dry weight basis). Mixing was carried out in a sigma mixer (Farinograph, Brabender, Germany) and additives were dosed slowly as water solutions or dispersions in such a way that the consistency of the final mixture was ~20%. Mixing was carried out at 50° C. for 20 min using a mixing rate of 30 rpm. After mixing the materials were cooled and stored at +4° C. until used.

Example 3. Extrusion of Modified High Consistency Cellulose in Film Form

Extrusion trials were carried out with the modified cellulose materials described in Example 2 and using a Brabender extruder equipped with one shaft (FIG. 1) and a dovetail orifice. Extrusion runs were carried out at 25° C. and a speed of rotation of 10 1/min. During extrusion solids concentration of the modified fibrillated cellulose was typically between 19 and 20%.

Extruded material was collected on a plastic sheet or board. The trials are summarised below in table 1.

TABLE 1

| Sample | Observation, Evaluation of film |
| --- | --- |
| Reference, no additive | Web-breaks, uneven film, low strength |
| CMC, 5% | Web-breaks, uneven film |
| Carrageenan, 1% | Web-breaks, low strength |
| Carrageenan, 2% | Web-breaks, low strength |
| PVA, 1% | Web-breaks |
| PVA, 4% | Web breaks |
| TEMPO oxidised cellulose nanofibrils, 1% | Few breaks, slightly ruptured film at edges |
| TEMPO oxidised cellulose nanofibrils, 2% | Even film, sufficient strength |

Effects of different polymers were tested as additives of high consistency cellulose during extrusion of cellulose film. Without any additive several breaks and uneven film with low strength was observed. The best results were obtained by the addition of TEMPO oxidised cellulose nanofibrils, which gave high enough viscosity and wet strength to the web against shear occurring at the opening of the orifice resulting to rather even film structure. Other bio-based or synthetic polymers may also be used as additives to enable proper extrusion and film properties. Images on the reference and TEMPO-CNF reinforced films are shown in FIGS. 2 and 3.

Example 4. Properties of Films

Casted films prepared following the procedure described in Example 1 were evaluated in terms of oxygen vapour transmission properties and mechanical properties including tensile strength, elongation and modulus.

Oxygen transmission vapour properties are summarized in the following table 2.

TABLE 2

| Sample | OTR, cc × mm/m2/24 h (50% RH, 23° C.) | OTR, cc × mm/m2/24 h (80% RH, 23° C.) |
| --- | --- | --- |
| Reference, VTT Birch kraft, fluidized | 0.1-0.5 | 4-6 |
| Enzymatically fibrillated cellulose | 0.2 | 5 |

*values are dependent on the batch and amount of film forming additive in the measured films Mechanical properties are summarized in the following table 3.

TABLE 3

| Sample | Tensile strength, MPa | Strain at break, % | Modulus, GPa |
| --- | --- | --- | --- |
| Reference, VTT Birch kraft, fluidized | 50-150 | 5-10 | 2-5 |
| Enzymatically fibrillated cellulose | 40 | 2-3 | 3.5-4 |

*values are dependent on the batch and amount of film forming additive in the measured films Based on the data provided, the enzymatically fibrillated cellulose when casted into film provides comparable oxygen vapour properties to films casted from fluidized fibres. The strength values are lower but sufficient strength is still provided.

CITATION LIST

Patent Literature

WO 2011/004300
WO 2015/092146

Non Patent Literature

Zhu, J. Y., Sabo R., Luo X., Integrated production of nano-fibrillated cellulose and vellulosic biofuel by enzymatic fibrillation of wood fibers, Green Chemistry, 2011, 13(5), pp. 1339-1344.

The invention claimed is:
1. A method for producing a film from enzyme fibrillated nanocellulose raw material, the method comprising:
mixing the enzyme fibrillated nanocellulose raw material with additives and forming a fiber web, wherein the enzyme fibrillated nanocellulose raw material comprises a consistency of between 15% and 40%,
laying the fiber web onto a metal substrate, wherein the laying of the fiber web is carried out by extrusion,
drying the fiber web on the metal substrate and forming a film material, wherein the film material adheres to the metal substrate to prevent shrinkage of the film material,
delaminating the film material from the metal substrate,
rewinding the film material onto a roll, and
calandering the film material from the roll and forming a film having a desired thickness;
wherein the additives comprise TEMPO-oxidized cellulose nanofibrils, and wherein the TEMPO-oxidized cellulose nanofibrils are present in an amount of 1-2% by dry weight of the fiber web.

2. The method of claim 1, wherein the enzyme fibrillated nanocellulose raw material has a consistency of between 20% and 30%.

3. The method of claim 1, wherein the thickness of the film is adjusted to between 20 μm and 500 μm.

4. The method of claim 1, wherein the additives further comprise an additional bio-based polymer.

5. The method of claim 1, wherein the method is continuous.

6. The method of claim 1, wherein the thickness of the film is adjusted to between 20 μm and 200 μm.

7. The method of claim 1, wherein the drying is done for 10 hours or less.

8. The method of claim 1, wherein the enzyme fibrillated nanocellulose raw material has a consistency of between 20% and 30%, and wherein the drying is done for a period of 4 to 5 hours.

9. The method of claim 1, wherein the additives further comprise a member selected from the group consisting of glycerol, carboxymethylated cellulose, carrageenan, and polyvinyl alcohol.

10. A method for producing a film from enzyme fibrillated nanocellulose raw material comprising:
mixing an enzyme fibrillated nanocellulose raw material having a consistency of between 15% and 40% with a bio-based polymer to form a fiber web,
extruding the fiber web onto a metal substrate,
drying the fiber web on the metal substrate to form a film material, wherein the film material adheres to the metal substrate to prevent shrinkage of the film material, and
delaminating the film material from the metal substrate to provide the film;
wherein the bio-based polymer comprises TEMPO-oxidized cellulose nanofibrils, and wherein the TEMPO-oxidized cellulose nanofibrils are present in an amount of 1-2% by dry weight of the fiber web.

11. The method of claim 10, wherein the enzyme fibrillated nanocellulose raw material has a consistency of between 20% and 30%.

12. The method of claim 10, wherein the extruding is carried out at a temperature of 25° C.

* * * * *